(12) United States Patent
Zhang et al.

(10) Patent No.: US 12,276,718 B1
(45) Date of Patent: Apr. 15, 2025

(54) METHOD FOR DETECTING AND TRACKING LOW-OBSERVABLE TARGET WITH BOOST-TO-GLIDE TRAJECTORY UNDER CONDITION OF AMBIGUOUS SLANT RANGE

(71) Applicant: Naval Aeronautical University, Yantai (CN)

(72) Inventors: Xiangyu Zhang, Yantai (CN); Hongsen Xie, Yantai (CN); Guochen Ding, Yantai (CN); Jie Yu, Yantai (CN); Changwen Zhan, Yantai (CN); Fengyuan Liu, Yantai (CN)

(73) Assignee: Naval Aeronautical University, Yantai (CN)

( * ) Notice: Subject to any disclaimer, the term of this patent is extended or adjusted under 35 U.S.C. 154(b) by 0 days.

(21) Appl. No.: 18/961,230

(22) Filed: Nov. 26, 2024

Related U.S. Application Data

(63) Continuation of application No. PCT/CN2024/072751, filed on Jan. 17, 2024.

(30) Foreign Application Priority Data

Sep. 27, 2023 (CN) .......................... 202311266320.7

(51) Int. Cl.
*G01S 13/58* (2006.01)
*G01S 7/41* (2006.01)

(52) U.S. Cl.
CPC .............. *G01S 13/58* (2013.01); *G01S 7/418* (2013.01)

(58) Field of Classification Search
None
See application file for complete search history.

(56) References Cited

U.S. PATENT DOCUMENTS

| | | | | |
|---|---|---|---|---|
| 4,851,848 A | * | 7/1989 | Wehner | ............... G01S 13/9011 |
| | | | | 342/201 |
| 5,952,961 A | * | 9/1999 | Denninger | ............ G01S 7/4004 |
| | | | | 342/357.73 |

(Continued)

FOREIGN PATENT DOCUMENTS

| | | |
|---|---|---|
| CN | 102298142 A | 12/2011 |
| CN | 105911542 A | 8/2016 |

(Continued)

*Primary Examiner* — Bernarr E Gregory
(74) *Attorney, Agent, or Firm* — George D. Morgan

(57) ABSTRACT

The present disclosure provides a method for detecting and tracking a low-observable target with a boost-to-glide trajectory under a condition of slant range ambiguity, and belongs to the field of detection and tracking of near-space hypersonic targets. The method includes: configuring an alternating pulse repetition frequency model for radar ranging; defining an extended non-coherent accumulation model in a distance-time plane for target detection; configuring an S-type recursive energy tracking model for target tracking; designing a recursive energy filter, conducting update by recursive energy to keep target tracking at a high signal-to-noise ratio, and obtaining a target trajectory by using a filter algorithm. According to the method of the present disclosure, pulse repetition frequencies within a same sampling period are designed to a constant value, so that there is enough energy for coherent accumulation detection.

10 Claims, 10 Drawing Sheets

(56) References Cited

U.S. PATENT DOCUMENTS

| | | | | |
|---|---|---|---|---|
| 6,724,916 B1 * | 4/2004 | Shyu | .................... | G01S 13/726 |
| | | | | 382/103 |
| 6,888,490 B1 * | 5/2005 | Brovko | ................ | G01S 13/904 |
| | | | | 342/25 R |
| 9,268,008 B1 * | 2/2016 | Abileah | ................ | G01S 7/414 |

FOREIGN PATENT DOCUMENTS

| | | | |
|---|---|---|---|
| CN | 106772299 A | 5/2017 | |
| KR | 20220113205 A | 8/2022 | |

* cited by examiner

METHOD FOR DETECTING AND TRACKING LOW-OBSERVABLE TARGET WITH BOOST-TO-GLIDE TRAJECTORY UNDER CONDITION OF AMBIGUOUS SLANT RANGE

CROSS-REFERENCE TO RELATED APPLICATIONS

The application claims priority to Chinese patent application No. 2023112663207, filed on Sep. 27, 2023, the entire contents of which are incorporated herein by reference.

TECHNICAL FIELD

The present disclosure belongs to the field of detection and tracking of near-space hypersonic targets, and particularly relates to a method for detecting and tracking a low-observable target with a boost-to-glide trajectory under a condition of slant range ambiguity.

BACKGROUND

At present, the near space refers to the airspace 20 km-100 km above the ground. A near-space hypersonic flight vehicle refers to an atmospheric or suborbital flight vehicle capable of flying at a speed of 5 Mach or higher in near space. Unlike traditional aerodynamic targets and satellite orbital targets, a near-space target has a unique hypersonic boost-to-glide trajectory which enables the near-space target to quickly attack any target in the world in an hour. In particular, as hypersonic flight vehicles such as AGM-183A and X-51A have successively passed testing, near-space hypersonic weapons have become a preferred means to implement a global strike strategy. However, existing radar early warning and defense systems cannot effectively track and intercept such targets.

In order to achieve early warning of a hypersonic target, a radar is required to detect the target from a great distance. If the hypersonic target can be detected and tracked from a great distance, the radar early warning and defense system will have enough time to deal with the threat from such hypersonic weapon. However, in a long-range detection mode, the problem of slant range ambiguity may occur during radar ranging. In the case of slant range ambiguity, it is difficult to distinguish which transmission pulse signal a received radar echo comes from, thereby resulting in the failure to obtain a true range between the target and the radar.

As a classic solution to slant range ambiguity, a multi-pulse repetition frequency method is widely used in the field of target detection and tracking. Such method has the advantages of solving the problem of slant range ambiguity while achieving coherent accumulation detection on the target. However, since a coherent accumulation period is allocated to multiple pulse repetition frequencies, it is difficult for echo energy after coherent accumulation to reach a threshold of target detection. Especially, in the case of a low signal-to-noise ratio, the problem of slant range ambiguity cannot be solved due to a missed detection of the target.

However, hypersonic targets inevitably have certain stealth performance. When a target moves at a hypersonic velocity, a large amount of shock wave plasma is generated around the target. The shock wave plasma can intensively absorb, scatter and reflect radar electromagnetic waves, thus endowing the target with certain stealth performance. This also means that it is difficult to obtain energy required for target detection simply through coherent accumulation in a short period of time, and thus the problem of slant range ambiguity cannot be effectively solved.

SUMMARY

The present disclosure provides a method for detecting and tracking a low-observable target with a boost-to-glide trajectory under a condition of slant range ambiguity, and aims at simultaneously solving target detection and tracking problems under the combined influence of slant range ambiguity, low observability and boost-to-glide maneuvering derived from the hypersonic motion of the target.

The method includes:
S1: configuring an alternating pulse repetition frequency model for radar ranging:
  S1.1: measuring an ambiguous slant range of the target by alternately transforming a pulse repetition frequency; and
  S1.2: restoring a true range of the target;
S2: defining an extended non-coherent accumulation model in a distance-time plane for target detection:
  S2.1: defining the extended non-coherent accumulation model;
  S2.2: selecting the distance-time plane;
  S2.3: extending a non-coherent accumulation detection mode based on distance-time Hough transform; and
  S2.4: detecting the low-observable target; and
S3: configuring an S-type recursive energy tracking model for target tracking:
  S3.1: configuring an S-type motion model; and
  S3.2: designing a recursive energy filter, conducting update by recursive energy to keep target tracking at a high signal-to-noise ratio, and obtaining a target trajectory by using a filter algorithm.

It should be further noted that, the measuring an ambiguous slant range of the target by alternately transforming a pulse repetition frequency in step S1 further includes:
  setting the pulse repetition frequency within a same sampling period as a constant value, and setting an ambiguous measurement of the target at moment k to $$Z_{amb}(k)=[r_{amb}(k),\theta(k),\varphi(k),a(k)]^T \quad (1)$$

where $r_{amb}(k)$ denotes an ambiguous slant range, $\theta(k)$ denotes an azimuth angle, $\varphi(k)$ denotes a pitch angle, and $a(k)$ denotes an amplitude of an echo pulse.

It should be further noted that, a radar ranging model is designed by using 3 alternately transformed pulse repetition frequencies, so that the ambiguous slant range of the target is expressed as:

$$r_{amb}(k) = \begin{cases} r^1_{amb}(k), & \text{if } \mod(k, 3) = 1 \\ r^2_{amb}(k), & \text{if } \mod(k, 3) = 2 \\ r^3_{amb}(k), & \text{if } \mod(k, 3) = 3 \end{cases} \quad (2)$$

where, $$r^j_{amb}(k) = \frac{1}{2} ct^j_{amb}(k) \quad (3)$$

the ambiguous slant range of the i'th pulse repetition frequency is calculated according to formula (3), and $t_{amb}^{1}(k)$ is calculated according to the following formula:

$$t_{amb}^{i}(k)=t_{true}(k)\mathrm{mod}(T_i) \quad (4)$$

where $t_{true}(k)$ denotes a true delay of an echo pulse, mod( ⊔ ) denotes a modular operation, $T_i=1/f_i$ denotes a pulse repetition period, $f_i$ denotes an i'th pulse repetition frequency, C denotes a light velocity, and i=1, 2, 3.

It should be further noted that, the step of restoring a true range of the target further includes:

assuming an i'th pulse repetition frequency of radar ranging is $f_i$, setting a maximum unambiguous slant range corresponding to $f_i$ as:

$$R_i=c/2f_i \quad (5)$$

extending an unambiguous slant range $r_{amb}^{i}(k)$ with an interval $R_i$ to obtain an extended slant range expressed as:

$$r_i^j(k)=(j-1)\times R_i+r_{amb}^{i}(k), j=1,2,\ldots,N_i \quad (6)$$

where $r_i^j(k)$ denotes an i'th extended slant range, and $N_i$ denotes a number of extended slant ranges;

assuming a true range is smaller than a radar range, calculating the number of extended slant ranges according to the following formula:

$$N_i=\mathrm{Int}(R_{max}/R_i) \quad (7)$$

where $R_{max}$ denotes a radar ranging scope, and Int(⊔) represents a rounding operation; and calculating an extended measurement of the target according to the following formula:

$$Z_i^j(k)=[r_i^j(k),\theta(k),\varphi(k),a(k)]^T, j=1,2,\ldots,N_i \quad (8)$$

where $Z_i^j(k)$ denotes an 1 th extended measurement value of an jth PRF.

It should be further noted that, the defining an extended non-coherent accumulation model in step S2 further includes:

firstly, conducting multi-hypothesis processing on measurement of alternating multi-pulse repetition frequencies; secondly, conducting coherent accumulation detection and non-coherent accumulation detection on the target so that accumulated energy of the low-observable target reaches a target detection threshold; and finally, completing detection of the low-observable target.

It should be further noted that, the selecting a distance-time plane in step S2 further includes:

assuming that the slant range of the target is r=600 km, and a radar angle measurement error is $\Delta\alpha=0.3°$, setting a target position measurement deviation to:

$$\Delta R = \frac{\pi \times \Delta\alpha}{180}r \approx 3.15 \text{ km} \quad (9)$$

according to a 3 δ decision criterion, judging that a maximum value of the target position measurement deviation is 9.45 km, and the target position measurement deviation is much greater than a radar range measurement error of a hectometer scale.

It should be further noted that, the extending a non-coherent accumulation detection mode based on distance-time Hough transform in step S2 further includes: assuming $(r_i^j(k),t(k))$ is a point in the distance-time plane, $r_i^j(k)$ denotes a jth extended slant range of a pulse repetition frequency $f_i$, and t(k) denotes a time stamp of $r_i^j(k)$, obtaining a unique curve corresponding to the point in a plane ρ-ϑ according to the following formula:

$$\rho=r_i^j(k)\cos\vartheta+t(k)\sin\vartheta\vartheta\in[0,\pi] \quad (10)$$

where ρ denotes a distance from a point $(r_i^j(k),t(k))$ to an origin, and ϑ denotes an included angle between an axis r and an axis ρ; and assuming a plurality of curves intersect at a point in the plane ρ-ϑ, judging that a straight line corresponding to the plurality of curves exists in the distance-time plane, wherein the straight line is expressed as:

$$\rho_0=r\cos\vartheta_0+t\sin\vartheta_0 \quad (11)$$

where $(\rho_0, \vartheta_0)$ denotes the intersection point of the plurality of curves, and r and t denote a distance variable and a time variable corresponding to the straight line.

It should be further noted that, the detecting a low-observable target in step S2 further includes: splitting the plane ρ-ϑ into a plurality of cell grids with a dimension of $\Delta\rho\times\Delta\vartheta$, and accumulating target energy in one of the cells; where a center of a cell grid (u, v) is expressed as:

$$\rho_u = \left(u - \frac{1}{2}\right)\Delta\rho, u = 1, 2, \ldots, N_\rho \quad (12)$$

$$\vartheta_v = \left(v - \frac{1}{2}\right)\Delta\vartheta, v = 1, 2, \ldots, N_\vartheta \quad (13)$$

where $$\Delta\rho=R_{max}/N_\rho \quad (14)$$

$$\Delta\vartheta=\pi/N_\vartheta \quad (15)$$

$N_\rho$ denotes a number of a cell ρ, $N_\vartheta$ denotes a number of a cell ϑ, and $R_{max}$ denotes a radar ranging scope;

based on discretization of the plane ρ-ϑ, conducting 1-pair $N_\vartheta$ mapping on a curve in the plane ρ-ϑ to replace to:

$$\begin{bmatrix} \rho_1 \\ \rho_2 \\ \rho_3 \\ M \\ \rho_{N_\vartheta} \end{bmatrix} = \begin{bmatrix} \cos\vartheta_1 & \sin\vartheta_1 \\ \cos\vartheta_2 & \sin\vartheta_2 \\ \cos\vartheta_3 & \sin\vartheta_3 \\ M & M \\ \cos\vartheta_{N_\vartheta} & \sin\vartheta_{N_\vartheta} \end{bmatrix} \begin{bmatrix} r_i^j(k) \\ t(k) \end{bmatrix} \quad (16)$$

where $(r_i^j(k),t(k))$ denotes a point in the distance-time plane, $\{(\rho_v, \vartheta_v)\}$ denotes a set of $N_\vartheta$ points in the plane ρ-ϑ, and v=1, 2, ..., $N_\vartheta$;

after conducting 1-pair $N_\vartheta$ mapping on the curve in the plane ρ-ϑ, storing energy in the point $(r_i^j(k),t(k))$ into the cell the curve passes by, and expressing energy in the cell grid (u, v) as:

$$a(\rho_u,\vartheta_v)=a(\rho_u,\vartheta_v)+A(k) \quad (17)$$

where $a(\rho_u, \vartheta_v)$ denotes existing energy in the cell grid (u, v), and A(k) denotes energy of point $(r_i^j(k),t(k))$ assuming a plurality of points in the distance-time plane are approximately connected into a straight line, and energy of the plurality of points is concentrated in one cell in the plane ρ-ϑ, expressing the low-observable target detection as following hypothesis testing:

$H_0$: $a(\rho_u, \vartheta_v) \geq \lambda$, the target is detected in the cell grid (u, v); or $H_1$: $a(\rho_u, \vartheta_v) < \lambda$, the target is not detected in the cell grid (u, v);

where $\lambda$ denotes an energy threshold;

assuming $H_0$ is established, conducting following Hough inverse mapping to obtain the target trajectory; and $$r = -t\tan\vartheta_v + \frac{\rho_u}{\cos\vartheta_v} \quad (18)$$

detecting the low-observable target from an extended slant range.

It should be further noted that, the configuring an S-type motion model in step S3 further includes:

designing an autocorrelation function of a target acceleration as $$R(\tau) = E[a(t+\tau)a(t)] = \sigma_\omega^2 \cos\omega_0\tau \quad (19)$$

where a(t) denotes a target acceleration at moment t, $\sigma_\omega^2$ denotes an instantaneous covariance of a(t), and $\omega_0$ denotes an angular rate of a target boost-to-glide trajectory;

conducting Fourier transform on the autocorrelation function of the target acceleration, wherein a power spectrum of the target acceleration is expressed as:

$$S(j\omega) = \pi\sigma_\omega^2[\delta(\omega-\omega_0) + \delta(\omega+\omega_0)] \quad (20)$$

configuring an approximate whitening filter as $$\tilde{H}(j\omega) = j\pi[\delta(\omega+\omega_0) - \delta(\omega-\omega_0)] \quad (21)$$

assuming $\tilde{h}(t)$ denotes an expression of $\tilde{H}(j\omega)$ in a time domain, expressing Laplace transform of $\tilde{h}(t)$ as $$\tilde{H}(s) = \frac{\omega_0}{s^2 + \omega_0^2} \quad (24)$$

thereby expressing a differential equation of $\tilde{h}(t)$ as $$\ddot{a}(t) = -\omega_0^2 a(t) + \omega_0 v(t) \quad (25)$$

where v(t) denotes a $\sigma_\omega^2/\pi$, input white noise with zero mean and a constant variance;

assuming $$X(t) = [x(t), \dot{x}(t), \ddot{x}(t), \dddot{x}(t)]^T \quad (26)$$

denotes a state vector of a target in an X direction at moment t, x(t), $\dot{x}(t)$, $\ddot{x}(t)$ and $\dddot{x}(t)$ denote a position, a velocity, an acceleration and a jerk of the target, respectively, and $$\ddot{x}(t) = a(t) \quad (27)$$

substituting the state vector X(t) into the differential equation of $\tilde{h}(t)$ to obtain a continuous motion equation of the target expressed as:

$$\dot{X}(t) = AX(t) + Bv(t) \quad (28)$$

where $$A = \begin{bmatrix} 0 & 1 & 0 & 0 \\ 0 & 0 & 1 & 0 \\ 0 & 0 & 0 & 1 \\ 0 & 0 & -\omega_0^2 & 0 \end{bmatrix} \quad (29)$$

conducting integral transform on two sides of the continuous motion equation of the target to obtain a discrete motion equation of the target expressed as:

$$X(k+1) = e^{AT}X(k) + \int_{kT}^{(k+1)T} e^{A((k+1)T-\tau)}Bv(\tau)d\tau \quad (31)$$

and rewriting the discrete motion equation of the target to $$X(k+1) = \Phi X(k) + V(k) \quad (32)$$

where $$\Phi = e^{AT} = \begin{bmatrix} 1 & T & \frac{1-\cos(\omega_0 T)}{\omega_0^2} & \frac{\omega_0 T - \sin(\omega_0 T)}{\omega_0^3} \\ 0 & 1 & \frac{\sin(\omega_0 T)}{\omega_0} & \frac{1-\cos(\omega_0 T)}{\omega_0^2} \\ 0 & 0 & \cos(\omega_0 T) & \frac{\sin(\omega_0 T)}{\omega_0} \\ 0 & 0 & -\omega_0\sin(\omega_0 T) & \cos(\omega_0 T) \end{bmatrix} \quad (33)$$

denotes a state-transition matrix, T denotes a time interval, and $$V(k) = \int_{kT}^{(k+1)T} e^{A((k+1)T-\tau)}Bv(\tau)d\tau \quad (34)$$

denotes a zero-mean Gaussian white noise with a constant variance $$Q(k) = \frac{\sigma_\omega^2}{\pi}\int_0^T e^{A\tau}B[e^{A\tau}B]^T d\tau \quad (35)$$

It should be further noted that, the designing a recursive energy filter in step S3 further includes:

assuming recursive energy at moment k is:

$$E(k) = \sum_{i=k-m+1}^{k} a(i) \quad (36)$$

where a(i) denotes energy of an ith trajectory point, and i=k−m+1, k−m+2, . . . , k;

introducing the recursive energy E(k) into the filter algorithm to provide a condition of a high signal-to-noise ratio for tracking a low-observable target; and expressing an update of the target trajectory by following hypothesis testing:

$H_0$: $E(k) \geq \lambda$, the update of the target trajectory is achieved by the recursive energy; and $H_1$: $E(k) < \lambda$, the target trajectory is terminated;

where $\lambda$ denotes an energy threshold the same as an energy threshold for target detection;

assuming $H_0$, updating the target trajectory by measurement of maximum energy in the tracking gate, and tracking the target in real time under a condition of a low signal-to-noise ratio;

assuming $$b(k+1) = \max\{b_1(k+1), b_2(k+1), \ldots, b_N(k+1)\} \quad (37)$$

denotes maximum measurement point energy in a tracking gate, where $b_l(k+1)$ denotes energy of an l th candidate measurement in the tracking gate, and N denotes a number of candidate measurements;

introducing b(k+1) into the filter algorithm, updating the target trajectory through a measurement point with the maximum energy in the tracking gate, and updating recursive energy as follows:

$$E(k+1)=E(k)+b(k+1)-a(k-m+1) \quad (38)$$

where a(k−m+1) denotes energy of a trajectory point at the last moment in the recursive energy; and keeping target tracking at a high signal-to-noise ratio by update of the recursive energy, and obtaining the target trajectory by using the filter algorithm.

It can be learned from the above technical solutions that the present disclosure has the following advantages:

1) According to the method for detecting and tracking a low-observable target with a boost-to-glide trajectory under a condition of slant range ambiguity, on one hand, pulse repetition frequencies within a same sampling period are designed to a constant value, so that there is enough energy for coherent accumulation detection; and on the other hand, pulse repetition frequencies during different sampling periods are designed to alternately transformed values, so that the requirement for solving the problem of slant range ambiguity can be met while the target is detected and tracked.

2) According to the method of the present disclosure, extended measurement after multi-hypothesis processing is combined with anti-stealth technology, which can solve slant range ambiguity while completing the detection of low-observable targets. It is no longer necessary to convert target measurement into traditional position measurement. Instead, low-observable targets can be directly detected in the range-time plane, which can effectively avoid position measurement deviations introduced during long range detection.

3) In view of the low observability of targets, the present disclosure is not limited to the case where a target has defaulted trajectory of linear motion, but predicts the boost-to-glide trajectory of the target by means of a periodic ski-jump. In this way, the maneuverability of the target can be considered while a high detection probability is ensured. In view of the characteristics of the boost-to-glide trajectory of the target, the present disclosure does not track the target measurement in real time by using traditional nearest neighbor filtering, but recursively tracks the target measurement by using the maximum recursive energy judgment.

In this way, the boost-to-glide trajectory of the target can be tracked in real time, and meanwhile, a high detection probability can be ensured.

4) The present disclosure can simultaneously solve the detection and tracking problems under the combined influence of slant range ambiguity, low observability and boost-to-glide maneuvering derived from the hypersonic motion of the target.

BRIEF DESCRIPTION OF THE DRAWINGS

To describe the technical solutions of the present disclosure more clearly, the following briefly introduces the accompanying drawings required for the description. Apparently, the accompanying drawings in the following description show merely some examples of the present disclosure, and a person of ordinary skill in the art may still derive other drawings from these accompanying drawings without creative efforts.

DETAILED DESCRIPTION OF THE EMBODIMENTS

Figure 1:
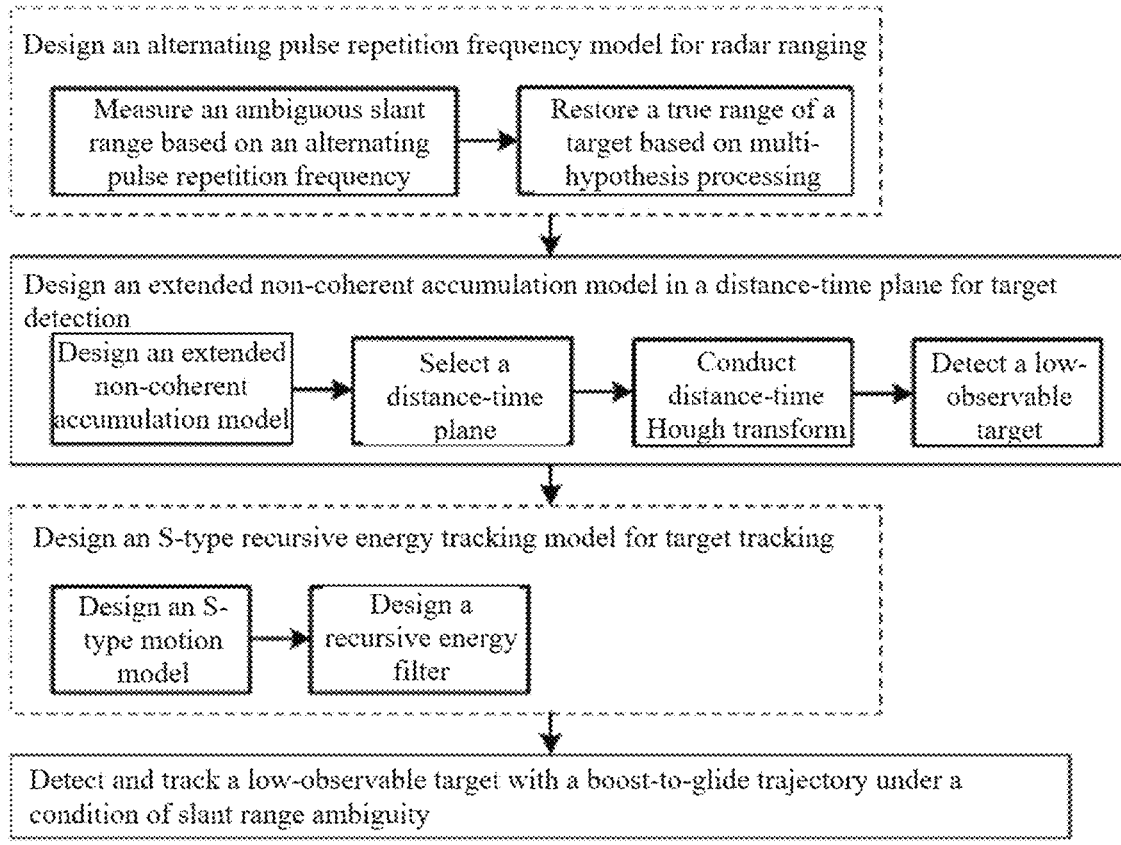
FIG. 1 shows a flowchart of a method for detecting and tracking a low-observable target with a boost-to-glide trajectory under a condition of slant range ambiguity.

The present disclosure provides a method for detecting and tracking a low-observable target with a boost-to-glide trajectory under a condition of slant range ambiguity, and aims at breaking through the restricts of traditional target detecting and tracking methods, and at the same time solving target detection and tracking problems under the combined influence of slant range ambiguity, low observability and boost-to-glide maneuvering derived from the hypersonic motion of the target, thereby improving the ability of existing radars to detect and track hypersonic targets.

According to the method for detecting and tracking a low-observable target with a boost-to-glide trajectory a condition of slant range ambiguity, associated data can be acquired and processed based on artificial intelligence technology. According to the method for detecting and tracking a low-observable target with a boost-to-glide trajectory under a condition of slant range ambiguity, a digital computer or a digital computer-controlled machine is utilized to simulate, extend and expand human intelligence, perceive the environment, acquire knowledge and use knowledge to obtain the theory, method, technology and application device for the best results.

Both hardware and software technologies are involved in the method for detecting and tracking a low-observable target with a boost-to-glide trajectory under a condition of slant range ambiguity. The basic technologies of the present disclosure generally include technologies such as sensors, dedicated artificial intelligence chips, cloud computing, distributed storage, big data processing technology, operating/interactive systems, mechanical & electrical integration, etc. The software technology for intelligent diagnosis of numerical control machine tools mainly includes machine learning/deep learning and programming languages. Programming languages include, but are not limited to, object oriented programming languages, such as Java, Smalltalk, and C++, and conventional procedural programming languages, such as C or similar programming languages.

The method for detecting and tracking a low-observable target with a boost-to-glide trajectory under a condition of slant range ambiguity is applied to one or more detection terminals. The detection terminal is a device capable of automatically performing numerical calculation and/or information processing according to a preset or stored instruction. The hardware of the device includes, but is not limited to, a microprocessor, an application specific integrated circuit (Application Specific Integrated Circuit, ASIC), a field-programmable gate array (Field-Programmable Gate Array, FPGA), a digital signal processor (Digital Signal Processor, DSP), an embedded device, or the like.

The detection terminal can be any electronic product that can perform human-computer interaction with a user, such as a personal computer, a tablet computer, a smartphone, a personal digital assistant (Personal Digital Assistant, PDA), and an Internet protocol television (Internet Protocol Television, IPTV).

The detection terminal may also include a network device and/or a user device. The network device includes, but is not limited to, a single network server, a server group composed of a plurality of network servers, or a cloud composed of a plurality of hosts or network servers based on cloud computing (Cloud Computing).

The network of the detection terminal includes, but is not limited to, the Internet, wide area network, metropolitan area network, local area network, virtual private network (Virtual Private Network, VPN), etc.

The problems to be solved by the method for detecting and tracking a low-observable target with a boost-to-glide trajectory under a condition of slant range ambiguity are as follows:

1) There are joint detection and tracking problems under the combined influence of slant range ambiguity, low observability and boost-to-glide maneuvering derived from the hypersonic motion of the target.

2) Under the condition of slant range ambiguity, an existing single-pulse repetition frequency ranging method cannot solve the problem of slant range ambiguity, though having enough energy to carry out coherent accumulation; while an existing multi-pulse repetition frequency ranging method can solve the problem of slant range ambiguity, but cannot provide enough energy for coherent accumulation detection of a target.

3) Under the dual effects of slant range ambiguity and low observability, there exists great incompatibility between existing methods for solving slant range ambiguity and methods for detecting low-observable targets. On the one hand, most of the existing methods for detecting low-observable targets only include the stealth performance of the target, but failure to fully consider the problem of low-observable target detection under slant range ambiguity; on the other hand, most of the existing methods for solving slant range ambiguity are based on the assumption of a high signal-to-noise ratio, but cannot solve the problem of slant range ambiguity due to a missed detection of the target in the case of a low signal-to-noise ratio.

4) Under the dual effects of low observability and irregular maneuverability, existing methods for tracking low-observable targets and methods for tracking maneuvering targets are no longer applicable, which makes it difficult to effectively track a low-observable target with a boost-to-glide trajectory. On the one hand, most of the existing methods for tracking maneuvering targets are based on the assumption of a high signal-to-noise ratio, but do not have the ability to handle a stealth target under a low signal-to-noise ratio; on the other hand, most of the existing methods for tracking low-observable targets limit the motion of a target to a linear motion, but ignore the fact that a true trajectory of the target is not limited to a single linear motion, making it not suitable for a boost-to-glide motion trajectory of a target.

To resolve the above problems, the present disclose provides a method for detecting and tracking a low-observable target with a boost-to-glide trajectory under a condition of slant range ambiguity. The method includes the following technical measures:

Step 1. Improve an existing radar ranging method and design a radar ranging model using pulses with alternating pulse repetition frequencies. In this case, the pulse repetition frequency of a radar is constant within a same sampling period, but changes alternately during different sampling periods. In addition, a radar echo has enough energy for coherent accumulation within the same sampling period, and can solve slant range ambiguity during different sampling periods. In this way, this method can not only detect and track a target, but also provide conditions for solving the problem of slant range ambiguity.

Step 2: Improve an existing target detection method by directly combining the extended measurement after multi-hypothesis processing with the anti-stealth technology in the range-time plane, and conducting non-coherent accumulation detection in the range-time plane, so as to effectively solve the problem of low-observable target detection under the condition of slant range ambiguity.

Step 3: Improve an existing target tracking method through the design of matching a boost-to-glide trajectory with a motion model and the development of a filter algorithm for maximum recursive energy, so that the method has the dual advantages of real-time processing and anti-stealth performance, thereby effectively solving the target tracking problem under the dual effects of low observability and boost-to-glide maneuverability.

The technical solutions in the embodiments of the present invention are clearly and completely described below with reference to the accompanying drawings in the embodiments of the present invention. Apparently, the described embodiments are merely some rather than all of the embodiments of the present invention. Based on the embodiments in the present disclosure, all other embodiments obtained by those of ordinary skill in the art without making creative labor fall within the scope of protection of the present disclosure.

FIG. 1 shows a flowchart of a method for detecting and tracking a low-observable target with a boost-to-glide trajectory under a condition of slant range ambiguity according to a specific embodiment. The method includes the following steps:

S1: Configure an alternating pulse repetition frequency model for radar ranging:

In an exemplary embodiment, during a ranging process, a radar ranging model is improved to a new mode in which pulse repetition frequencies are alternately transformed. In this case, pulse repetition frequencies within a same sampling period are constant, so that there is enough energy for radar echo to conduct coherent accumulation detection; pulse repetition frequencies during different sampling periods are alternately transformed, so that after multi-hypothesis processing, a target can be detected and tracked, while the requirement for solving the problem of slant range ambiguity can be met.

S1.1: Measure an ambiguous slant range of a target by alternately transforming a pulse repetition frequency.

Figure 2:
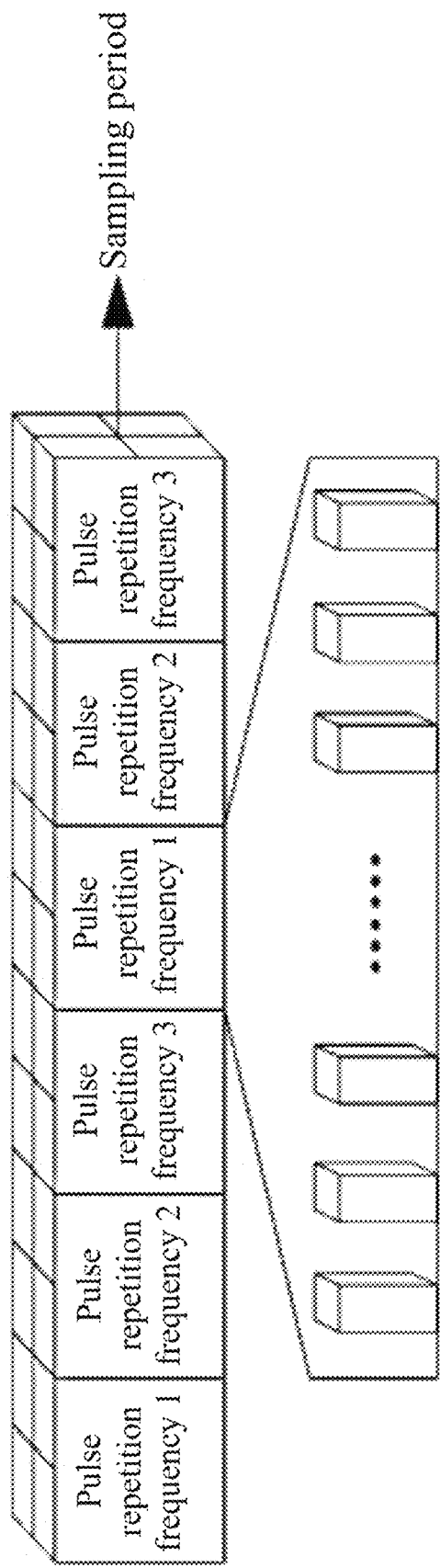
FIG. 2 shows a diagram of an alternating pulse repetition frequency ranging model.

The pulse repetition frequencies within a same sampling period are constant, but are alternately transformed during different sampling periods, as shown in FIG. 2.

Assuming an ambiguous measurement of the target at moment k is:

$$Z_{amb}(k)=[r_{amb}(k),\theta(k),\varphi(k),a(k)]^T \quad (1)$$

where $r_{amb}(k)$ denotes an ambiguous slant range, $\theta(k)$ denotes an azimuth angle, $\varphi(k)$ denotes a pitch angle, and $a(k)$ denotes an amplitude of an echo pulse.

If a radar ranging model is designed by using 3 alternately transformed pulse repetition frequencies, the ambiguous slant range of the target is expressed as:

$$r_{amb}(k) = \begin{cases} r_{amb}^1(k), & \text{if } \mod(k, 3) = 1 \\ r_{amb}^2(k), & \text{if } \mod(k, 3) = 2 \\ r_{amb}^3(k), & \text{if } \mod(k, 3) = 3 \end{cases} \quad (2)$$

where $$r_{amb}^i(k) = \frac{1}{2} c t_{amb}^i(k) \quad (3)$$

the ambiguous slant range of the i'th pulse repetition frequency is calculated according to formula (3), and $$t_{amb}^i(k) = t_{true}(k) \mod(T_i) \quad (4)$$

a fuzzy delay of an echo pulse is calculated according to formula (4), where $t_{true}(k)$ denotes a true delay of an echo pulse, $\mod(\square)$ denotes a modular operation, $T_i = 1/f_i$ denotes a pulse repetition period, $f_i$ denotes an i'th pulse repetition frequency, C denotes a light velocity, and i=1, 2, 3.

S1.2: Restore a true range of the target.

Since the ambiguous slant range is not the true range of the target, the ambiguous slant range is extended to several uncertainty intervals by multi-hypothesis processing, so that the true position of the target can be obtained from one of the uncertainty intervals.

Assuming an i'th pulse repetition frequency of radar ranging is $f_i$, a maximum unambiguous slant range corresponding to the same is:

$$R_i = c/2f_i \quad (5)$$

If an unambiguous slant range $r_{amb}^i(k)$ is extended with an interval $R_i$, an extended slant range can be expressed as:

$$r_i^j(k) = (j-1) \times R_i + r_{amb}^i(k), j=1,2,\ldots,N_i \quad (6)$$

where $r_i^j(k)$ denotes an i'th extended slant range, and $N_i$ denotes a number of extended slant ranges.

In the meanwhile, a true range is smaller than a radar range, and the number of extended slant ranges is calculated according to the following formula:

$$N_i = \text{Int}(R_{max}/R_i) \quad (7)$$

where $R_{max}$ denotes a radar ranging scope, and $\text{Int}(\sqcup)$ represents a rounding operation.

An extended measurement of the target can be calculated according to the following formula:

$$Z_i^j(k) = [r_i^j(k), \theta(k), \varphi(k), a(k)]^T, j=1,2,\ldots,N_i \quad (8)$$

where $Z_i^j(k)$ denotes an jth extended measurement value of an i'th PRF.

Figure 3:
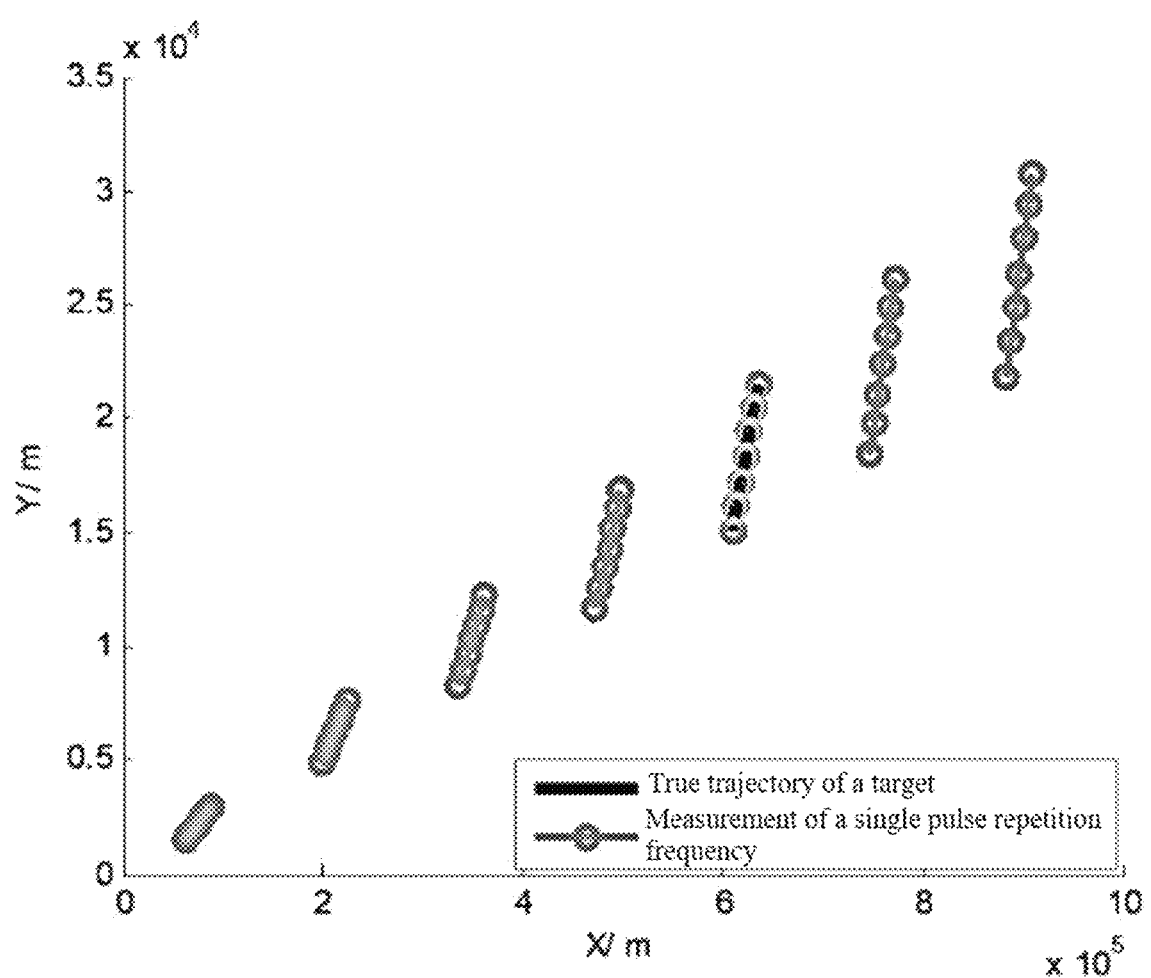
FIG. 3 shows a diagram of extended measurement on a condition of a single pulse repetition frequency.
Figure 4:
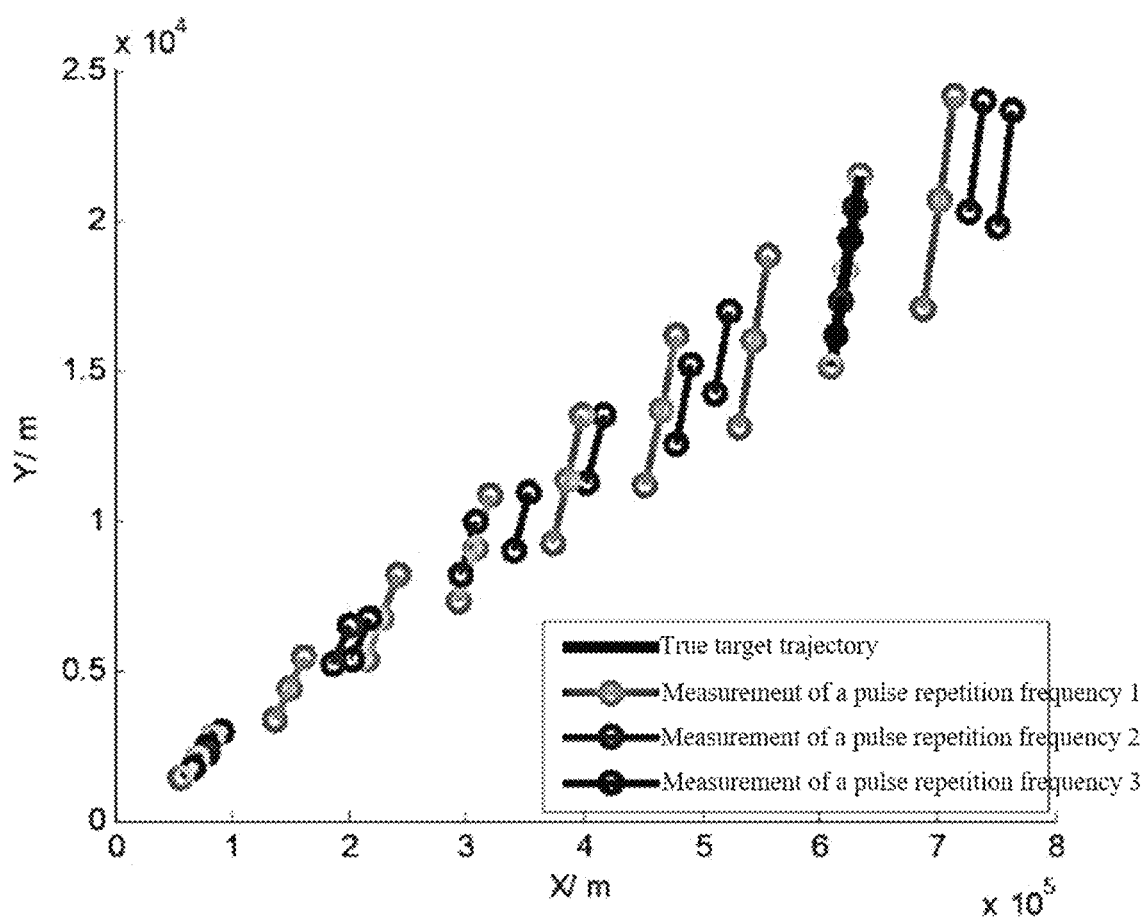
FIG. 4 shows a diagram of extended measurement on a condition of an alternating pulse repetition frequency.

Through multi-hypothesis processing, the ambiguous slant range is extended to several uncertainty intervals. For a single pulse repetition frequency, a true range of the target can be restored from one of the uncertainty intervals, but it is difficult to distinguish which is the true range of the target, as shown in FIG. 3. In the case where the pulse repetition frequency is transformed alternately, an uninterrupted trajectory can be formed only at a true position of the target, as shown in FIG. 4. In other words, the true range of a target can be distinguished while detecting and tracking the target.

S2: Define an extended non-coherent accumulation model in a distance-time plane for target detection.

At a detection stage, a target detection model is improved to a new extended non-coherent accumulation model in a distance-time plane. In this case, slant range ambiguity can be solved while the detection of low-observable targets is completed. In addition, position measurement deviations introduced during long-range radar detection can be effectively avoided.

S2.1: Define an extended non-coherent accumulation model.

In this embodiment, through multi-hypothesis processing, the problem of slant range ambiguity can be solved while coherent accumulation of the target is detected. However, in the case of a low signal-to-noise ratio, a missed detection of the target may occur when energy for coherent accumulation does not reach a detection. In this case, the problem of slant range ambiguity cannot be solved due to the missed detection of the target.

Figure 5:
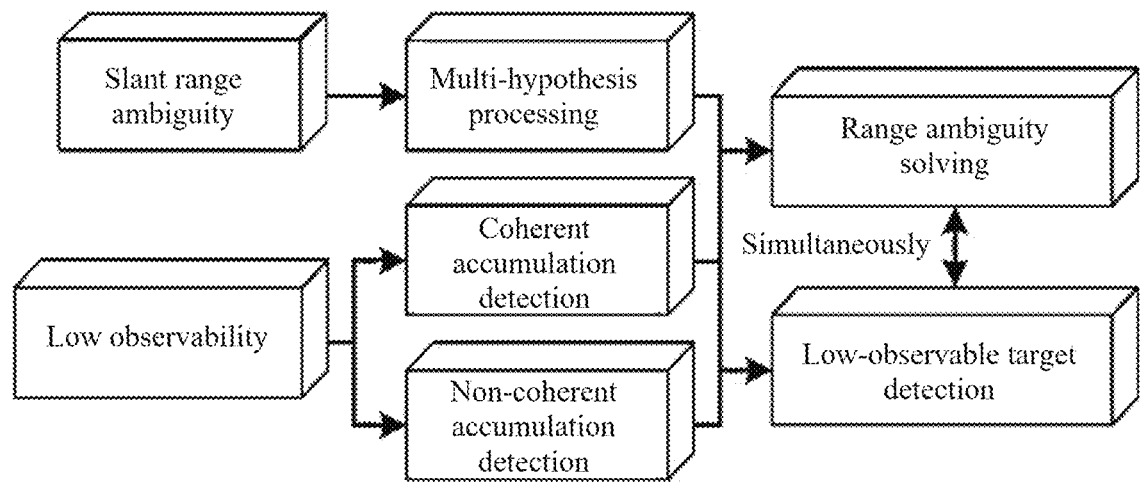
FIG. 5 shows a design diagram of an extended non-coherent accumulation model.

Therefore, this embodiment provides an extended non-coherent accumulation model as shown in FIG. 5, so that the detection of a low-observable target can be completed while the problem of slant range ambiguity is solved.

Firstly, multi-hypothesis processing is conducted on measurement of alternating multi-pulse repetition frequencies, so that the requirement for solving the problem of slant range ambiguity can be met while the low-observable target is detected;

secondly, coherent accumulation detection and non-coherent accumulation detection are conducted on the target, so that accumulated energy of the low-observable target reaches a target detection threshold; and finally, the two are combined, so that the detection of low-observable targets can be completed while the problem of slant range ambiguity is solved.

S2.2: Select a distance-time plane.

According to embodiments of the present disclosure, unlike a classic method for non-coherent accumulation detection, it is no longer necessary to convert extended slant range measurement into traditional position measurement. Instead, non-coherent accumulation detection can be directly conducted in the range-time plane. In this case, slant range ambiguity can be solved while the detection of low-observable targets is completed. In addition, position measurement deviations introduced during long-range radar detection can be effectively avoided.

A radar position deviation is mainly caused by an angle measurement error of the radar and is proportional to a slant range of the target. Assuming that the slant range of the target is r=600 km, and the radar angle measurement error is $\Delta\alpha=0.3°$, a target position measurement deviation is:

$$\Delta R = \frac{\pi \times \Delta\alpha}{180} r \approx 3.15 \text{ km} \quad (9)$$

According to a 3 $\delta$ decision criterion, a maximum target position measurement deviation may reach 9.45 km, and the deviation is much greater than a radar range measurement error of a hectometer scale.

In this case, if traditional position measurement is replaced with range-time measurement during the process of non-coherent accumulation detection on a target, the position measurement deviation introduced during long-range radar detection can be effectively avoided. Therefore, the target is subject to extended non-coherent accumulation by using a distance-time plane.

S2.3: Extend a non-coherent accumulation detection mode based on distance-time Hough transform.

According to the embodiment of the present disclosure, a target trajectory in a short time can be approximately regarded as a straight line, and in view of this, Hough transform is selected to design extended distance-time non-coherent accumulation detection. This is because through the Hough transform processing of target measurement, the problem of linear detection in a short time can be transformed into the problem of energy accumulation, so that the detection of a low-observable target can be achieved under the condition of an improved signal-to-noise ratio.

Assuming $(r_i^j(k), t(k))$ is a point in the distance-time plane, where $r_i^j(k)$ denotes jth extended slant range of a pulse repetition frequency $f_i$, and $t(k)$ denotes a time stamp of $r_i^j(k)$, a unique curve corresponding to the point can be obtained from a plane $\rho$-$\vartheta$ in the following formula:

$$\rho = r_i^j(k)\cos\vartheta + t(k)\sin\vartheta\,\vartheta \in [0,\pi] \quad (10)$$

where $\rho$ denotes a distance from a point $(r_i^j(k), t(k))$ to an origin, and $\vartheta$ denotes an included angle between an axis r and an axis $\rho$.

Assuming a plurality of such curves intersect at a point in the plane $\rho$-$\vartheta$, a straight line corresponding to a plurality of curves exists in the distance-time plane. The straight line can be expressed as:

$$\rho_0 = r\cos\vartheta_0 + t\sin\vartheta_0 \quad (11)$$

where $(\rho_0, \vartheta_0)$ denotes the intersection point of the plurality of curves, and r and t denote a distance variable and a time variable corresponding to the straight line.

Figure 6:
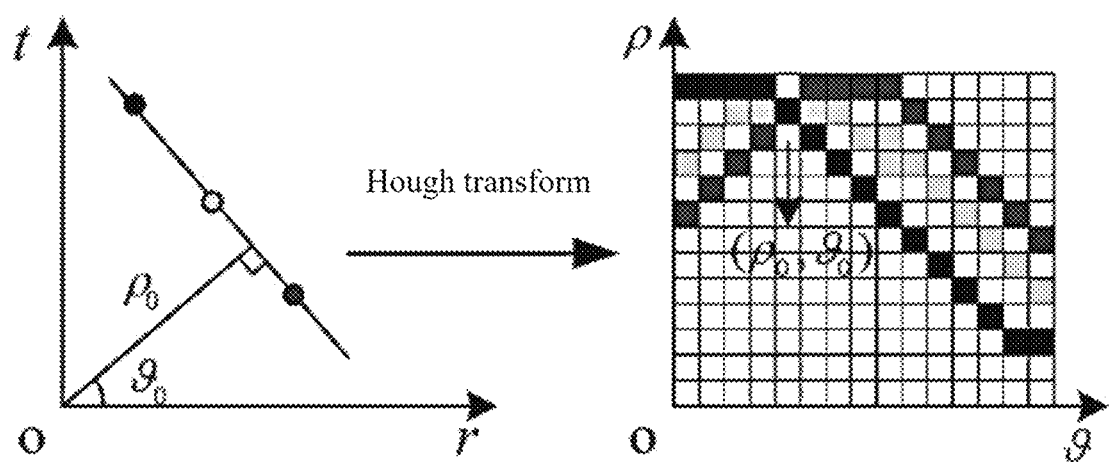
FIG. 6 shows a non-coherent accumulation detection diagram based on distance-time Hough transform.

According to the present invention, the intersection point of the plurality of curves is found from the plan $\rho$-$\vartheta$ through energy accumulation, so that a low-observable target can be detected in the distance-time plane, as shown in FIG. 6.

S2.4: Detect a low-observable target.

In a short time, a target trajectory can be approximately regarded as a straight line. However, it is not a true straight line indeed. In actual situations, the curves of the target in the plane $\rho$-$\vartheta$ do not intersect at one point, but are concentrated in a certain region.

Therefore, in the present disclosure, the plane $\rho$-$\vartheta$ is split into a plurality of cell grids with a dimension of $\Delta\rho \times \Delta\vartheta$, so that target energy is accumulated in one of the cells; where a center of a cell grid (u, v) is expressed as:

$$\rho_u = \left(u - \frac{1}{2}\right)\Delta\rho, \ u = 1, 2, \ldots, N_\rho \quad (12)$$

$$\vartheta_v = \left(v - \frac{1}{2}\right)\Delta\vartheta, \ v = 1, 2, \ldots, N_\vartheta \quad (13)$$

where $$\Delta\rho = R_{max}/N_\rho \quad (14)$$

$$\Delta\vartheta = \pi/N_\vartheta \quad (15)$$

$N_\rho$ denotes a number of a cell $\rho$, $N_\vartheta$ denotes a number of a cell $\vartheta$, and $R_{max}$ denotes a radar ranging scope;

based on discretization of the plane $\rho$-$\vartheta$, conducting 1-pair $N_\vartheta$ mapping on a curve in the plane $\rho$-$\vartheta$ to replace to:

$$\begin{bmatrix} \rho_1 \\ \rho_2 \\ \rho_3 \\ M \\ \rho_{N_\vartheta} \end{bmatrix} = \begin{bmatrix} \cos\vartheta_1 & \sin\vartheta_1 \\ \cos\vartheta_2 & \sin\vartheta_2 \\ \cos\vartheta_3 & \sin\vartheta_3 \\ M & M \\ \cos\vartheta_{N_\vartheta} & \sin\vartheta_{N_\vartheta} \end{bmatrix} \begin{bmatrix} r_i^j(k) \\ t(k) \end{bmatrix} \quad (16)$$

where $(r_i^j(k), t(k))$ denotes a point in the distance-time plane, $\{(\rho_v, \vartheta_v)\}$ denotes a set of $N_\vartheta$ points in the plane $\rho$-$\vartheta$, and $v = 1, 2, \ldots, N_\vartheta$;

after 1-pair $N_\vartheta$ mapping is conducted on the curve in the plane $\rho$-$\vartheta$, energy in the point $(r_i^j(k), t(k))$ is stored into the cell the curve passes by, and energy in the cell grid (u, v) is expressed as:

$$a(\rho_u, \vartheta_v) = a(\rho_u, \vartheta_v) + A(k) \quad (17)$$

where $a(\rho_u, \vartheta_v)$ denotes existing energy in the cell grid (u, v), and $A(k)$ denotes energy of point $(r_i^j(k), t(k))$.

If some points in the distance-time plane are approximately connected into a straight line, energy of the points is concentrated in one cell in the plane $\rho$-$\vartheta$. In this way, the problem of low-observable target detection can be expressed as following hypothesis testing:

$H_0$: $a(\rho_u, \vartheta_v) \geq \lambda$, the target is detected in the cell grid (u, v); or $H_1$: $a(\rho_u, \vartheta_v) < \lambda$, the target is not detected in the cell grid (u, v);

where $\lambda$ denotes an energy threshold.

Assuming $H_0$ is established, conduct following Hough inverse mapping to obtain the target trajectory:

$$r = -t\tan\vartheta_v + \frac{\rho_u}{\cos\vartheta_v} \quad (18)$$

thereby detecting the low-observable target from an extended slant range.

S3: Configure an S-type recursive energy tracking model for target tracking.

At a tracking stage, a target tracking model is improved to a new S-type recursive energy tracking model. In this case, the boost-to-glide trajectory of the target can be predicted by an S type motion model, and the target trajectory under a low signal-to-noise ratio can be updated by a filter algorithm for recursive energy.

S3.1: Configure an S-type motion model.

Figure 7:
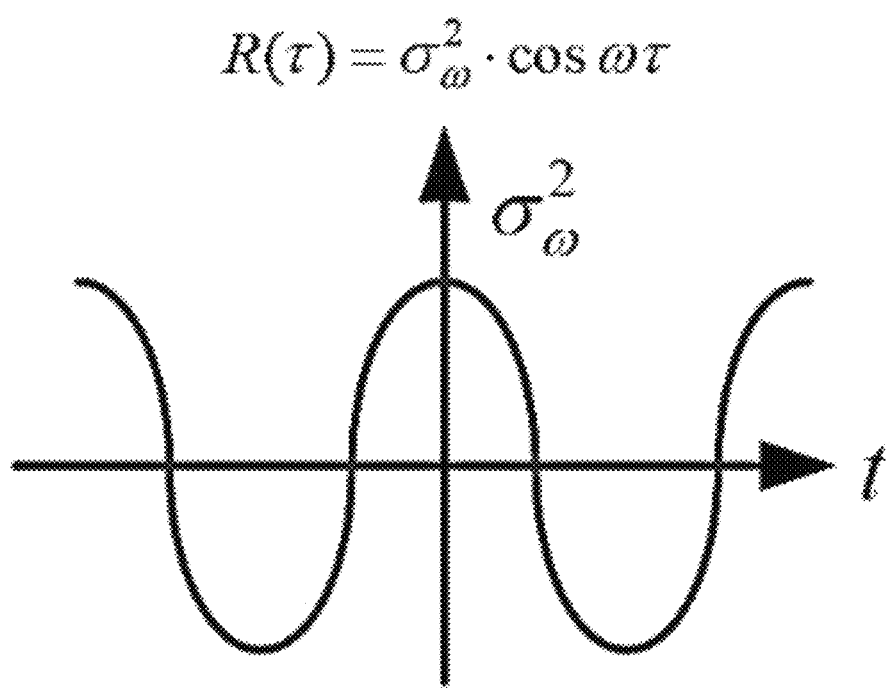
FIG. 7 shows a design diagram of an acceleration auto-correlation function of an S-type motion model.

In an exemplary embodiment, an S-type motion model is designed to match a boost-to-glide motion trajectory unique to hypersonic targets. Different from a classic Singer motion model, with the S-type motion model, the target acceleration is no longer designed as a zero-mean Markov random process with exponential autocorrelation. Instead, the target acceleration is designed as a zero-mean Markov process with cosine autocorrelation based on full consideration of characteristics of periodic motion of the target, as shown in FIG. 7.

An autocorrelation function of a target acceleration is designed as:

$$R(\tau) = E[a(t+\tau)a(t)] = \sigma_\omega^2 \cos\omega_0\tau \quad (19)$$

where $a(t)$ denotes a target acceleration at moment t, $\sigma_\omega^2$ denotes an instantaneous covariance of $a(t)$, and $\omega_0$ denotes an angular rate of a target boost-to-glide trajectory.

Fourier transform is conducted on the autocorrelation function of the target acceleration, where a power spectrum of the target acceleration can be expressed as:

$$S(j\omega) = \pi \sigma_\omega^2 [\delta(\omega - \omega_0) + \delta(\omega + \omega_0)] \quad (20)$$

This embodiment may be designed as follows:

$$\tilde{H}(j\omega) = j\pi[\delta(\omega + \omega_0) - \delta(\omega - \omega_0)] \quad (21)$$

Formula (21) denotes an approximate whitening filter, $\tilde{N}(j\omega) = \sigma_\omega^2/\pi$ denotes a power spectrum of input white noise, and output of $\tilde{H}(j\omega)$ can be expressed as:

$$\tilde{S}(j\omega) = \pi \sigma_w^2 [\delta^2(\omega - \omega_0) + \delta^2(\omega + \omega_0)] \quad (22)$$

By comparing $\tilde{S}(j\omega)$ and $S(j\omega)$, it can be concluded that:

$$\tilde{S}(j\omega) \approx S(j\omega) \quad (23)$$

In other words, it is reasonable to design $\tilde{H}(j\omega)$ as an approximate whitening filter.

In this embodiment, assuming $\tilde{h}(t)$ denotes an expression of $\tilde{H}(j\omega)$ in a time domain, Laplace transform of $\tilde{h}(t)$ can be expressed as:

$$\tilde{H}(s) = \frac{\omega_0}{s^2 + \omega_0^2} \quad (24)$$

so that a differential equation of $\tilde{h}(t)$ can be expressed as:

$$\ddot{a}(t) = -\omega_0^2 a(t) + \omega_0 v(t) \quad (25)$$

where v(t) denotes a $\sigma_\omega^2/\pi$ input white noise with zero mean and a constant variance.

Assuming $$X(t) = [x(t), \dot{x}(t), \ddot{x}(t), \dddot{x}(t)]^T \quad (26)$$

Formula (26) denotes a state vector of a target in an X direction at moment t, x(t), $\dot{x}(t)$, $\ddot{x}(t)$ and $\dddot{x}(t)$ denote a position, a velocity, an acceleration and a jerk of the target, respectively, and $$\ddot{x}(t) = a(t) \quad (27)$$

by substituting the state vector X(t) into the differential equation of $\tilde{h}(t)$, a continuous motion equation of the target can be expressed as:

$$\dot{X}(t) = AX(t) + Bv(t) \quad (28)$$

where $$A = \begin{bmatrix} 0 & 1 & 0 & 0 \\ 0 & 0 & 1 & 0 \\ 0 & 0 & 0 & 1 \\ 0 & 0 & -\omega_0^2 & 0 \end{bmatrix} \quad (29)$$

By conducting integral transform on two sides of the continuous motion equation of the target, a discrete motion equation of the target can be obtained, which is expressed as follows:

$$X(k+1) = e^{AT} X(k) + \int_{kT}^{(k+1)T} e^{A((k+1)T - \tau)} Bv(\tau) d\tau \quad (31)$$

By rewriting the formula, the following formula can be obtained:

$$X(k+1) = \Phi X(k) + V(k) \quad (32)$$

where $$\Phi = e^{AT} = \begin{bmatrix} 1 & T & \frac{1 - \cos(\omega_0 T)}{\omega_0^2} & \frac{\omega_0 T - \sin(\omega_0 T)}{\omega_0^3} \\ 0 & 1 & \frac{\sin(\omega_0 T)}{\omega_0} & \frac{1 - \cos(\omega_0 T)}{\omega_0^2} \\ 0 & 0 & \cos(\omega_0 T) & \frac{\sin(\omega_0 T)}{\omega_0} \\ 0 & 0 & -\omega_0 \sin(\omega_0 T) & \cos(\omega_0 T) \end{bmatrix} \quad (33)$$

formula (33) denotes a state-transition matrix, T denotes a time interval, and $$V(k) = \int_{kT}^{(k+1)T} e^{A((k+1)T - \tau)} Bv(\tau) d\tau \quad (34)$$

formula (34) denotes a zero-mean Gaussian white with a constant variance in formula (35).

$$Q(k) = \frac{\sigma_\omega^2}{\pi} \int_0^T e^{A\tau} B [e^{A\tau} B]^T d\tau \quad (35)$$

S3.2: In this embodiment, a recursive energy filter is further designed.

Since the boost-to-glide trajectory of the target can be predicted by the designed S-type motion model, the remaining work is to design a filter algorithm to update the target trajectory under a low-observable condition.

It should be noted that, recursive energy is introduced in target tracking, so as to transform the problem of tracking low-observable targets into the problem of tracking high-observable targets.

Figure 8:
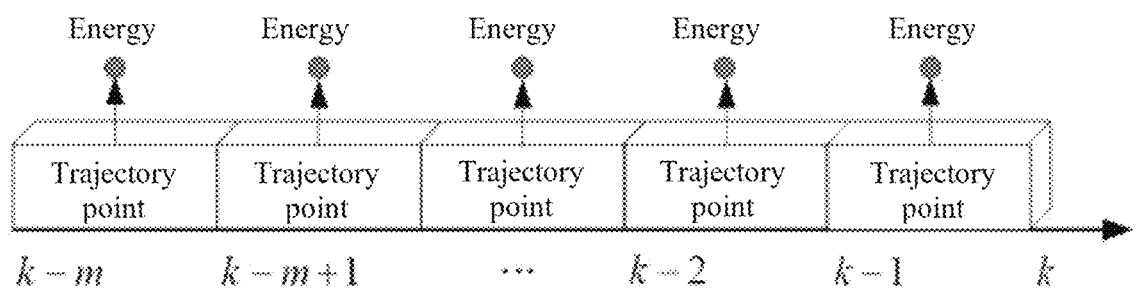
FIG. 8 shows a construction diagram of recursive energy.

On the one hand, the recursive energy is composed of the energy of m tracking points, so that a low-observable target can be tracked under a high signal-to-noise ratio condition, as shown in FIG. 8.

Figure 9:
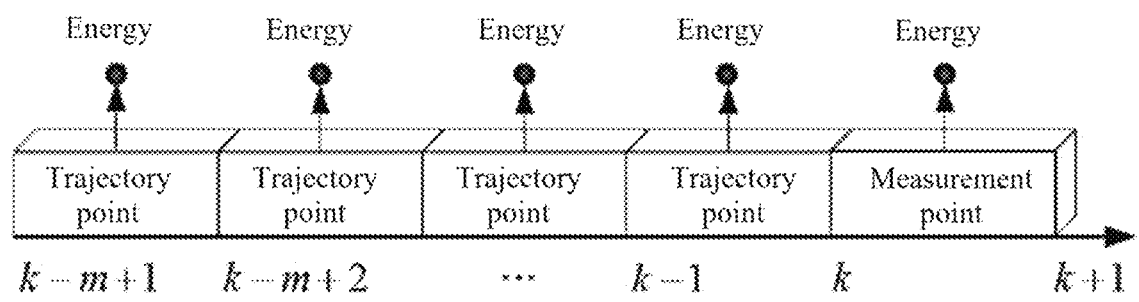
FIG. 9 shows an updated diagram of recursive energy.

On the other hand, the update of the recursive energy is realized by replacing energy of a tracking point at the last moment with a energy of a measurement point, so that a low-observable target can be tracked in real time, as shown in FIG. 9.

In this embodiment, assuming recursive energy at moment k is:

$$E(k) = \sum_{i=k-m+1}^{k} a(i) \quad (36)$$

where a(i) denotes energy of an ith trajectory point, and i=k−m+1, k−m+2, . . . , k.

By introducing the recursive energy E(k) into the filter algorithm, a condition of a high signal-to-noise ratio is provided for tracking a low-observable target. The update of the target trajectory can be expressed by following hypothesis testing:

$H_0$: $E(k) \geq \lambda$, the update of the target trajectory is achieved by the recursive energy.

$H_1$: $E(k) < \lambda$, the target trajectory is terminated.

$\lambda$ denotes an energy threshold the same as an energy threshold for target detection.

Figure 10:
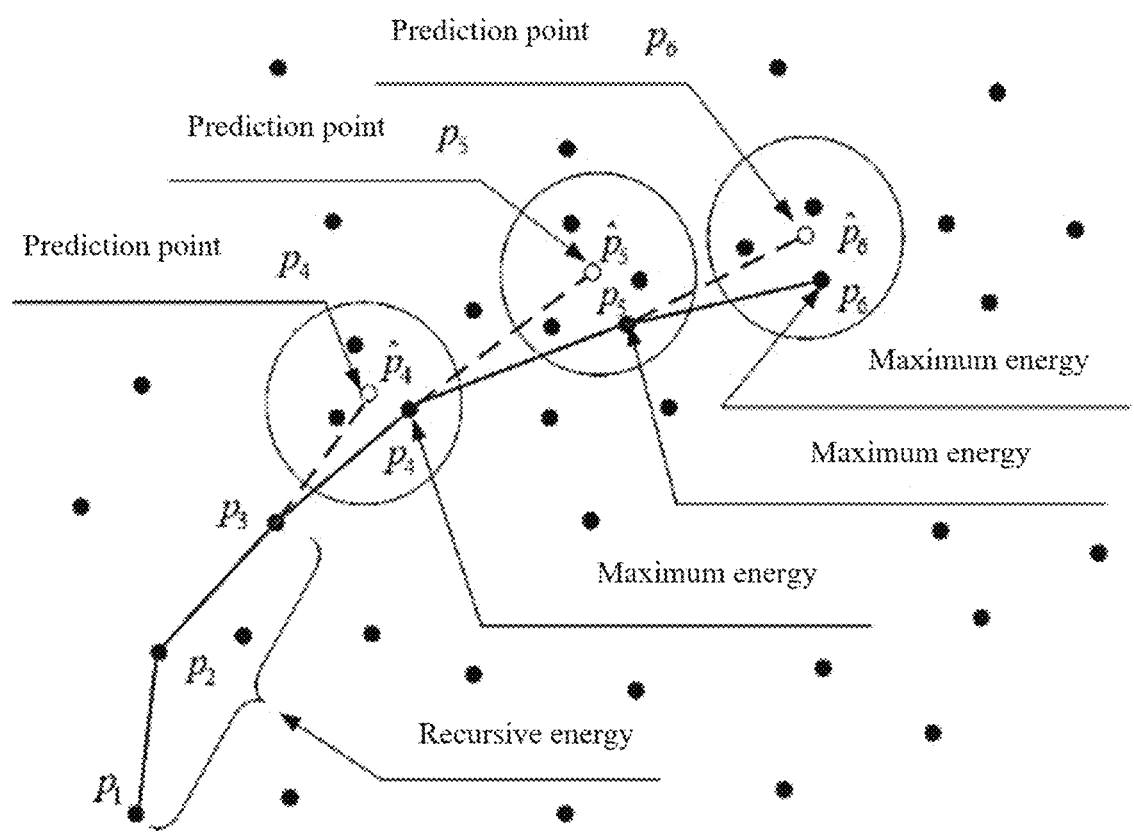
FIG. 10 shows a filter diagram of maximum energy.

Assuming $H_0$, the target trajectory is updated by measurement of maximum energy in the tracking gate, and the target can be tracked in real time under a condition of a low signal-to-noise ratio, as shown in FIG. 10.

This embodiment is the same as a traditional filter algorithm. The target trajectory is updated online through the measurement in the tracking gate, so that the boost-to-glide trajectory of the target can be tracked in real time.

Unlike the traditional filter algorithm, the target trajectory is updated by a measurement point with maximum energy, rather than by a measurement point with a minimum statistical distance, so as to transform the problem of tracking low-observable targets into the problem of tracking high-observable targets.

In this embodiment, assuming formula (37) denotes maximum measurement point energy in a tracking gate, $b_i(k+1)$ denotes energy of an ith candidate measurement in the tracking gate, and N denotes a number of candidate measurements.

assuming $$b(k+1)=\max\{b_1(k+1),b_2(k+1), \ldots ,b_N(k+1)\} \quad (37)$$

By introducing $b(k+1)$ into the filter algorithm, the target trajectory is updated through a measurement point with the maximum energy in the tracking gate, and recursive energy is updated as follows:

$$E(k+1)=E(k)+b(k+1)-a(k-m+1) \quad (38)$$

where $a(k-m+1)$ denotes energy of a trajectory point at the last moment in the recursive energy.

Target tracking can be kept at a high signal-to-noise ratio by update of the recursive energy, so that a target trajectory can be obtained by using an existing filter algorithm.

It should be understood that the serial number of each step in the above embodiment does not indicate the order of performing the process. The order of performing each process is determined by its function and internal logic, and should not limit the implementation of the embodiments of the present disclosure.

In this way, the method for detecting and tracking a low-observable target with a boost-to-glide trajectory under a condition of slant range ambiguity aims at solving target detection and tracking problems under the combined influence of slant range ambiguity, low observability and boost-to-glide maneuvering derived from the hypersonic motion of the target. According to the present disclosure, a traditional radar ranging method is improved by improving an existing radar ranging model to a new model of alternately transforming pulse repetition frequencies, so that the requirement for solving the problem of slant range ambiguity can be met while the target is detected and tracked. Next, an existing target detection method is improved by combining the extended measurement after multi-hypothesis processing with the anti-stealth technology in the range-time plane, which can solve slant range ambiguity while completing the detection of low-observable targets, and effectively avoid position measurement deviations introduced during long-range radar detection. Finally, an existing target tracking method is improved through the design of matching a boost-to-glide trajectory with a motion model and the development of a filter algorithm for maximum recursive energy, so that the method has the dual advantages of real-time processing and anti-stealth performance, thereby effectively solving the target tracking problem under the dual effects of low observability and boost-to-glide maneuverability.

Units and algorithmic steps in examples described with reference to embodiments disclosed in the method for detecting and tracking a low-observable target with a boost-to-glide trajectory under a condition of slant range ambiguity can be implemented with electronic hardware, computer software, or a combination thereof. In order to clearly describe the interchangeability between the hardware and the software, compositions and steps of each example have been generally described according to functions in the foregoing descriptions. Whether these functions are implemented in hardware or software depends on specific applications of the technical solutions and design constraints. A person skilled in the art may use different methods to implement the described functions for each specific application, but such implementation should not be considered to be beyond the scope of the present disclosure.

The features, structures, or characteristics described in the method for detecting and tracking a low-observable target with a boost-to-glide trajectory under a condition of slant range ambiguity may be incorporated into one or more implementations in any suitable manner. In the following description, many specific details are provided to give a full understanding of the embodiments of the present invention. However, those skilled in the art will be aware that the technical solutions of the present invention may be practiced with one or more of specific details omitted, or other methods, components, apparatuses, steps and the like may be used. In other cases, well-known methods, apparatuses, implementations or operations are not shown or described in detail to avoid obscuring aspects of the present invention.

The above description of the disclosed embodiments enables those skilled in the art to implement or use the present invention. Various modifications to these embodiments are readily apparent to those skilled in the art, and the generic principles defined herein may be practiced in other embodiments without departing from the spirit or scope of the present disclosure. Thus, the present disclosure is not limited to the embodiments shown herein but falls within the widest scope consistent with the principles and novel features disclosed herein.

What is claimed is:

1. A method for detecting and tracking a low-observable target with a boost-to-glide trajectory under a condition of slant range ambiguity, wherein the method comprises:
    S1: configuring an alternating pulse repetition frequency model for radar ranging:
        S1.1: measuring an ambiguous slant range of the target by alternately transforming a pulse repetition frequency; and
        S1.2: restoring a true range of the target;
    S2: defining an extended non-coherent accumulation model in a distance-time plane for target detection:
        S2.1: defining the extended non-coherent accumulation model;
        S2.2: selecting the distance-time plane;
        S2.3: extending a non-coherent accumulation detection mode based on distance-time Hough transform; and
        S2.4: detecting the low-observable target; and
    S3: configuring an S-type recursive energy tracking model for target tracking:
        S3.1: configuring an S-type motion model; and
        S3.2: designing a recursive energy filter, conducting update by recursive energy to keep target tracking at a high signal-to-noise ratio, and obtaining a target trajectory by using a filter algorithm.

2. The method for detecting and tracking a low-observable target with a boost-to-glide trajectory under a condition of slant range ambiguity according to claim 1, wherein the measuring an ambiguous slant range of the target by alternately transforming a pulse repetition frequency in step S1 further comprises:

setting the pulse repetition frequency within a same sampling period as a constant value, and setting an ambiguous measurement of the target at moment k to $$Z_{amb}(k)=[r_{amb}(k),\theta(k),\varphi(k),a(k)]^T \quad (1)$$

wherein $r_{amb}(k)$ denotes an ambiguous slant range, $\theta(k)$ denotes an azimuth angle, $\varphi(k)$ denotes a pitch angle, and $a(k)$ denotes an amplitude of an echo pulse.

3. The method for detecting and tracking a low-observable target with a boost-to-glide trajectory under a condition of slant range ambiguity according to claim 2, wherein a radar ranging model is designed by using 3 alternately transformed pulse repetition frequencies, so that the ambiguous slant range of the target is expressed as:

$$r_{amb}(k) = \begin{cases} r_{amb}^1(k), \text{ if mod } (k,3) = 1 \\ r_{amb}^2(k), \text{ if mod } (k,3) = 2 \\ r_{amb}^3(k), \text{ if mod } (k,3) = 3 \end{cases} \quad (2)$$

wherein $$r_{amb}^i(k) = \frac{1}{2}ct_{amb}^i(k) \quad (3)$$

the ambiguous slant range of the i'th pulse repetition frequency is calculated according to formula (3), and $t_{amb}^1(k)$ is calculated according to the following formula:

$$t_{amb}^i(k)=t_{true}(k)\text{mod}(T_i) \quad (4)$$

wherein $t_{true}(k)$ denotes a true delay of an echo pulse, mod (•) denotes a modular operation, $T_i=1/f_i$ denotes a pulse repetition period, $f_i$ denotes an i'th pulse repetition frequency, C denotes a light velocity, and i=1, 2, 3.

4. The method for detecting and tracking a low-observable target with a boost-to-glide trajectory under a condition of slant range ambiguity according to claim 1, wherein the step of restoring a true range of the target further comprises:

assuming an i'th pulse repetition frequency of radar ranging is $f_i$, setting a maximum unambiguous slant range corresponding to $f_i$ as:

$$R_i=c/2f_i \quad (5)$$

extending an unambiguous slant range $r_{amb}^i(k)$ with an interval $R_i$ to obtain an extended slant range expressed as:

$$r_i^j(k)=(j-1)\times R_i+r_{amb}^i(k), j=1,2,\ldots,N_i \quad (6)$$

wherein $r_i^j(k)$ denotes an i'th extended slant range, and $N_i$ denotes a number of extended slant ranges;

assuming a true range is smaller than a radar range, calculating the number of extended slant ranges according to the following formula:

$$N_i=\text{Int}(R_{max}/R_i) \quad (7)$$

wherein $R_{max}$ denotes a radar ranging scope, and Int(•) represents a rounding operation; and calculating an extended measurement of the target according to the following formula:

$$Z_i^j(k)=[r_i^j(k),\theta(k),\varphi(k),a(k)]^T, j=1,2,\ldots,N_i \quad (8)$$

wherein $Z_i^j(k)$ denotes an jth extended measurement value of an i'th PRF.

5. The method for detecting and tracking a low-observable target with a boost-to-glide trajectory under a condition of slant range ambiguity according to claim 1, wherein the defining an extended non-coherent accumulation model in step S2 further comprises:

firstly, conducting multi-hypothesis processing on measurement of alternating multi-pulse repetition frequencies; secondly, conducting coherent accumulation detection and non-coherent accumulation detection on the target so that accumulated energy of the low-observable target reaches a target detection threshold; and finally, completing detection of the low-observable target.

6. The method for detecting and tracking a low-observable target with a boost-to-glide trajectory under a condition of slant range ambiguity according to claim 5, wherein the selecting a distance-time plane in step S2 further comprises:

assuming that the slant range of the target is r=600 km, and a radar angle measurement error is $\Delta\alpha=0.3°$, setting a target position measurement deviation to:

$$\Delta R = \frac{\pi \times \Delta\alpha}{180}r \approx 3.15 \text{ km} \quad (9)$$

according to a 3 δ decision criterion, judging that a maximum value of the target position measurement deviation is 9.45 km, and the target position measurement deviation is much greater than a radar range measurement error of a hectometer scale.

7. The method for detecting and tracking a low-observable target with a boost-to-glide trajectory under a condition of slant range ambiguity according to claim 5, wherein the extending a non-coherent accumulation detection mode based on distance-time Hough transform in step S2 further comprises:

assuming $(r_i^j(k),t(k))$ is a point in the distance-time plane, $r_i^j(k)$ denotes a jth extended slant range of a pulse repetition frequency $f_i$, and $t(k)$ denotes a time stamp of $r_i^j(k)$, obtaining a unique curve corresponding to the point from a plane ρ-ϑ according to the following formula:

$$\rho=r_i^j(k)\cos\vartheta+t(k)\sin\vartheta, \vartheta\in[0,\pi] \quad (10)$$

wherein ρ denotes a distance from a point $(r_i^j(k),t(k))$ to an origin, and ϑ denotes an included angle between an axis r and an axis ρ; and assuming a plurality of curves intersect at a point in the plane ρ-ϑ, judging that a straight line corresponding to the plurality of curves exists in the distance-time plane, wherein the straight line is expressed as:

$$\rho_0=r\cos\vartheta_0+t\sin\vartheta_0 \quad (11)$$

wherein $(\rho_0, \vartheta_0)$ denotes the intersection point of the plurality of curves, and r and t denote a distance variable and a time variable corresponding to the straight line.

8. The method for detecting and tracking a low-observable target with a boost-to-glide trajectory under a condition of slant range ambiguity according to claim 7, wherein the detecting a low-observable target in step S2 further comprises:

splitting the plane ρ-ϑ into a plurality of cell grids with a dimension of $\Delta\rho\times\delta\vartheta$, and accumulating target energy in one of the cells; wherein a center of a cell grid (u, v) is expressed as:

$$\rho_u = \left(u - \frac{1}{2}\right)\Delta\rho, u = 1, 2, \ldots, N_\rho \tag{12}$$

$$\vartheta_v = \left(v - \frac{1}{2}\right)\Delta\vartheta, v = 1, 2, \ldots, N_\vartheta \tag{13}$$

wherein $$\Delta\rho = R_{max}/N_\rho \tag{14}$$

$$\Delta\vartheta = \pi/N_\vartheta \tag{15}$$

$N_\rho$ denotes a number of a cell $\rho$, $N_\vartheta$ denotes a number of a cell $\vartheta$, and $R_{max}$ denotes a radar ranging scope;
based on discretization of the plane $\rho$-$\vartheta$, conducting 1-pair $N_\vartheta$ mapping on a curve in the plane $\rho$-$\vartheta$ to replace to:

$$\begin{bmatrix} \rho_1 \\ \rho_2 \\ \rho_3 \\ M \\ \rho_{N_\vartheta} \end{bmatrix} = \begin{bmatrix} \cos\vartheta_1 & \sin\vartheta_1 \\ \cos\vartheta_2 & \sin\vartheta_2 \\ \cos\vartheta_3 & \sin\vartheta_3 \\ M & M \\ \cos\vartheta_{N_\vartheta} & \sin\vartheta_{N_\vartheta} \end{bmatrix} \begin{bmatrix} r_i^j(k) \\ t(k) \end{bmatrix} \tag{16}$$

wherein $(r_i^j(k), t(k))$ denotes a point in the distance-time plane, $\{(\rho_v, \vartheta_v)\}$ denotes a set of $N_\vartheta$ points in the plane $\rho$-$\vartheta$, and $v = 1, 2, \ldots, N_\vartheta$;
after conducting 1-pair $N_\vartheta$ mapping on the curve in the plane $\rho$-$\vartheta$, storing energy in the point $(r_i^j(k), t(k))$ into the cell the curve passes by, and expressing energy in the cell grid (u, v) as:

$$a(\rho_u, \vartheta_v) = a(\rho_u, \vartheta_v) + A(k) \tag{17}$$

wherein $a(\rho_u, \vartheta_v)$ denotes existing energy in the cell grid (u, v), and, $A(k)$ denotes energy of $(r_i^j(k), t(k))$;
assuming a plurality of points in the distance-time plane are approximately connected into a straight line, and energy of the plurality of points is concentrated into one cell in the plane $\rho$-$\vartheta$, expressing the low-observable target detection as following hypothesis testing:
$H_0$: $a(\rho_u, \vartheta_v) \geq \lambda$, the target is detected in the cell grid (u, v); or
$H_1$: $a(\rho_u, \vartheta_v) < \lambda$, the target is not detected in the cell grid (u, v);
wherein $\lambda$ denotes an energy threshold;
assuming $H_0$ is established, conducting following Hough inverse mapping to obtain the target trajectory; and $$r = -t\tan\vartheta_v + \frac{\rho_u}{\cos\vartheta_v} \tag{18}$$

detecting the low-observable target from an extended slant range.

9. The method for detecting and tracking a low-observable target with a boost-to-glide trajectory under a condition of slant range ambiguity according to claim 1, wherein the configuring an S-type motion model in step S3 further comprises:
designing an autocorrelation function of a target acceleration as $$R(\tau) = E[a(t+\tau)a(t)] = \sigma_\omega^2 \cos\omega_0\tau \tag{19}$$

wherein a(t) denotes a target acceleration at moment t, $\sigma_\omega^2$ denotes an instantaneous covariance of a(t), and $\omega_0$ denotes an angular rate of a target boost-to-glide trajectory;
conducting Fourier transform on the autocorrelation function of the target acceleration, wherein a power spectrum of the target acceleration is expressed as:

$$S(j\omega) = \pi\sigma_\omega^2[\delta(\omega-\omega_0) + \delta(\omega+\omega_0)] \tag{20}$$

configuring an approximate whitening filter as $$\tilde{H}(j\omega) = j\pi[\delta(\omega+\omega_0) - \delta(\omega-\omega_0)] \tag{21}$$

assuming $\tilde{h}(t)$ denotes an expression of $\tilde{H}(j\omega)$ in a time domain, expressing Laplace transform of $\tilde{h}(t)$ as $$\tilde{H}(s) = \frac{\omega_0}{s^2 + \omega_0^2} \tag{24}$$

thereby expressing a differential equation of $\tilde{h}(t)$ as $$\ddot{a}(t) = -\omega_0^2 a(t) + \omega_0 v(t) \tag{25}$$

wherein v(t) denotes a $\sigma_\omega^2/\pi$ input white noise with zero mean and a constant variance;
assuming $$X(t) = [x(t), \dot{x}(t), \ddot{x}(t), \dddot{x}(t)]^T \tag{26}$$

denotes a state vector of a target in an X direction at moment t, x(t), $\dot{x}(t)$, $\ddot{x}(t)$ and $\dddot{x}(t)$ denote a position, a velocity, an acceleration and a jerk of the target, respectively, and $$\ddddot{x}(t) = a(t) \tag{27}$$

substituting the state vector X(t) into the differential equation of $\tilde{h}(t)$ to obtain a continuous motion equation of the target expressed as:

$$\dot{X}(t) = AX(t) + Bv(t) \tag{28}$$

Wherein $$A = \begin{bmatrix} 0 & 1 & 0 & 0 \\ 0 & 0 & 1 & 0 \\ 0 & 0 & 0 & 1 \\ 0 & 0 & -\omega_0^2 & 0 \end{bmatrix} \tag{29}$$

$$B = [0\ 0\ 0\ \omega_0]^T \tag{30}$$

conducting integral transform on two sides of the continuous motion equation of the target to obtain a discrete motion equation of the target expressed as:

$$X(k+1) = e^{AT}X(k) + \int_{kT}^{(k+1)T} e^{A((k+1)T-\tau)}Bv(\tau)d\tau \tag{31}$$

and rewriting the discrete motion equation of the target to $$X(k+1) = \Phi X(k) + V(k) \tag{32}$$

wherein $$\Phi = e^{AT} = \begin{bmatrix} 1 & T & \frac{1-\cos(\omega_0 T)}{\omega_0^2} & \frac{\omega_0 T - \sin(\omega_0 T)}{\omega_0^3} \\ 0 & 1 & \frac{\sin(\omega_0 T)}{\omega_0} & \frac{1-\cos(\omega_0 T)}{\omega_0^2} \\ 0 & 0 & \cos(\omega_0 T) & \frac{\sin(\omega_0 T)}{\omega_0} \\ 0 & 0 & -\omega_0\sin(\omega_0 T) & \cos(\omega_0 T) \end{bmatrix} \tag{33}$$

denotes a state-transition matrix, T denotes a time interval, and $$V(k) = \int_{kT}^{(k+1)T} e^{A((k+1)T-\tau)} Bv(\tau) d\tau \qquad (34)$$

denotes a zero-mean Gaussian white noise with a constant variance $$Q(k) = \frac{\sigma_\omega^2}{\pi} \int_0^T e^{A\tau} B [e^{A\tau} B]^T d\tau. \qquad (35)$$

10. The method for detecting and tracking a low-observable target with a boost-to-glide trajectory under a condition of slant range ambiguity according to claim 9, wherein the designing a recursive energy filter in step S3 further comprises:

assuming recursive energy at moment k is:

$$E(k) = \sum_{i=k-m+1}^{k} a(i) \qquad (36)$$

wherein a(i) denotes energy of an ith trajectory point, and i=k−m+1, k−m+2, . . . , k;

introducing the recursive energy E(k) into the filter algorithm to provide a condition of a high signal-to-noise ratio for tracking a low-observable target; and expressing an update of the target trajectory by following hypothesis testing:

$H_0$: $E(k) \geq \lambda$, the update of the target trajectory is achieved by the recursive energy; and $H_1$: $E(k) < \lambda$, the target trajectory is terminated;

wherein $\lambda$ denotes an energy threshold the same as an energy threshold for target detection;

assuming $H_0$, updating the target trajectory by measurement of maximum energy in the tracking gate, and tracking the target in real time under a condition of a low signal-to-noise ratio;

assuming $$b(k+1) = \max\{b_1(k+1), b_2(k+1), \ldots, b_N(k+1)\} \qquad (37)$$

denotes maximum measurement point energy in a tracking gate, wherein $b_i(k+1)$ denotes energy of an ith candidate measurement in the tracking gate, and N denotes a number of candidate measurements;

introducing b(k+1) into the filter algorithm, updating the target trajectory through a measurement point with the maximum energy in the tracking gate, and updating recursive energy as follows:

$$E(k+1) = E(k) + b(k+1) - a(k-m+1) \qquad (38)$$

wherein a (k−m+1) denotes energy of a trajectory point at the last moment in the recursive energy; and keeping target tracking at a high signal-to-noise ratio by update of the recursive energy, and obtaining the target trajectory by using the filter algorithm.

* * * * *